United States Patent [19]
O'Connell

[11] Patent Number: 5,943,820
[45] Date of Patent: Aug. 31, 1999

[54] FLOWER HOLDER WITH ANGLED FLOWER SUPPORT

[76] Inventor: Donald L. O'Connell, 605 Purchase St., Rye, N.Y. 10580

[21] Appl. No.: 08/810,211

[22] Filed: Feb. 28, 1997

[51] Int. Cl.⁶ ..................................................... A01G 5/00
[52] U.S. Cl. ........................................ 47/41.12; 47/41.01
[58] Field of Search ................................ 47/41.01, 41.1, 47/41.11, 41.12, 41.13, 65.7; 206/423, 173, 740, 762, 763, 733; 248/27.8, 346.11, 346.2, 910; 119/72, 73; 220/23.2, 503, 507, 527, 575, 908.1; D6/403; D99/19; D11/143; 134/135

[56] References Cited

U.S. PATENT DOCUMENTS

| D. 105,367 | 7/1937 | Swordling | D7/667 |
|---|---|---|---|
| 3,962,825 | 6/1976 | O'Connell | 47/41.12 |
| 4,858,381 | 8/1989 | Walton et al. | 47/79 |

*Primary Examiner*—Michael J. Carone
*Assistant Examiner*—Son T. Nguyen
*Attorney, Agent, or Firm*—Norris Mc Laughlin & Marcus; L. P. Brooks

[57] ABSTRACT

A holder for supporting flower arrangements has first and second compartments for receiving first and second water retaining foam blocks. When mounted on the holder, the first foam block has a top surface which is parallel to the bottom wall of the first compartment. The second compartment has a bottom wall which intersects the bottom wall of the first compartment at an angle greater than zero, and the second foam block has a top surface which is inclined at such angle relative to the top surface of the first foam block so that the holder can be mounted on a support with surfaces intersecting at an angle and both surfaces will be covered. Stems of flowers can be inserted orthogonally into the top surfaces of both the foam blocks to provide that flowers extend from the holder vertically and at such angle relative to the vertically extending flowers. One side surface of one foam block abuts a side surface of the other foam block and at least one of the blocks is tapered at its side to permit the abutting of the side surfaces and such orientation of the top surfaces of the blocks. A water receptacle underlies the bottoms of the compartments for holding any water which drains from the foam blocks by way of apertures in the bottom walls.

23 Claims, 3 Drawing Sheets

FLOWER HOLDER WITH ANGLED FLOWER SUPPORT

FIELD OF THE INVENTION

The present invention relates to holders for flowers, and more particularly, a holder which can receive a water retaining block so that the top surface of the block is angled relative to a surface upon which the holder is supported.

BACKGROUND

Holders for floral arrangements and other items requiring moisture are well known in the art. See U.S. Pat. Nos. 3,962,825; 4,004,367; 4,058,929, incorporated by reference herein, and Ser. No. 08/400,259, filed in the name of the applicant. In general, these holders comprise a water impermeable, molded plastic base member in the shape of a cross, a heart, a rectangle, a wreath, etc., which is generally cup or U-shaped in cross-section. The member can define one or more cavities which are closed at their ends to retain water and can receive water retaining blocks, such as plastic foam blocks. The blocks are retained in the base member by various devices, such as stirrup fasteners which encircle the outer faces of the blocks and are retained by apertures formed in the base member, or by providing a push-fit between the blocks and the walls of the cavities. The blocks are supplied with water after the blocks are inserted into the cavities and, preferably, before stems of the flowers are pushed into the blocks.

Currently, holders for floral arrangements are constructed to receive a foam block such that the top surface of the block is parallel to the surface upon which the holder is supported. The stems of flowers are ordinarily placed orthogonally into the top surface of such blocks to provide that the flowers are securely retained in and extend generally vertically from the holder.

Often, it also is desired to include flowers in a holder so that the flowers extend at an angle relative to flowers which are inserted into and vertically extend from the top surface of a foam block in the holder. For example, when flower holders are placed on top of a casket which has a raised central portion with a flat top joined to its vertical sides by a sloping portion extending at an angle to both the flat top and the vertical sides, it is desirable to have the flowers over both the flat top and the sloping portions and, preferably, drape over the upper portions of the vertical sides. With the prior art holders in which the sides of the blocks extend only vertically, it is difficult, and requires skill, to insert the stems of the flowers into a side of the block and provide a good appearance as well as to cause the flowers to overlie the sloping portions of the casket with a cascade effect. With a block having only horizontal and vertical surfaces, the stems of flowers which are to extend at an angle relative to the vertically extending flowers generally are inserted at an angle offset from the orthogonal to the top surface of the foam block and into the vertical side surfaces of the block. The insertion of stems into a foam block at a non-orthogonal angle to its top surface, in addition to the difficulties set forth, does not always result in secure retention of those stems in the block.

Therefore, there exists a need for a holder which can receive foam blocks which stems of flowers can be placed easily, conveniently and securely so that the stems of the flowers extend not only substantially vertically from the holder but also extend from the holder at an angle to the vertical direction.

SUMMARY OF THE INVENTION

In accordance with the present invention, a holder for flowers includes a base member defining a cavity in which first and second water retaining blocks are received. When the holder is mounted on a support, such as a casket, with a horizontal top surface and a sloping surface extending at an angle to the top surface, the base member has two block supporting surfaces, one extending horizontally and one extending downwardly at an angle to the horizontal, the angle corresponding substantially to the angle at which the sloping surface extends to the horizontal direction. Accordingly, when the blocks are mounted on the supporting surfaces, the top surface of one of the blocks is substantially horizontal, and the top surface of the other block is at such angle relative to the top surface of the one block. Stems of flowers can then be inserted orthogonally into the respective foam blocks to obtain an aesthetic floral arrangement in which flowers are securely held in the foam blocks and the flowers cover the sloping surface of the support and can drape over the side surfaces of the support.

In one embodiment of the invention, supports protrude from side walls or bottom walls which define the cavity for supporting the foam blocks which are received in the cavity of the holder.

In a further embodiment, stirrup fasteners engage the top surface and optionally, the exposed side faces of the blocks, and are detachably engageable to the base member. In still a further embodiment, the fasteners include projections or teeth which impinge upon the top surface of the foam blocks when the fasteners are engaged with the base member, thereby further securing the blocks in the holder.

BRIEF DESCRIPTION OF THE DRAWINGS

Other objects and advantages of the present invenetion will be apparent from the followoing detailed description of the presently preferred embodiments, which description should be considered in conjunction with the accompanying drawings in which.

DETAILED DESCRIPTION

Figure 1:
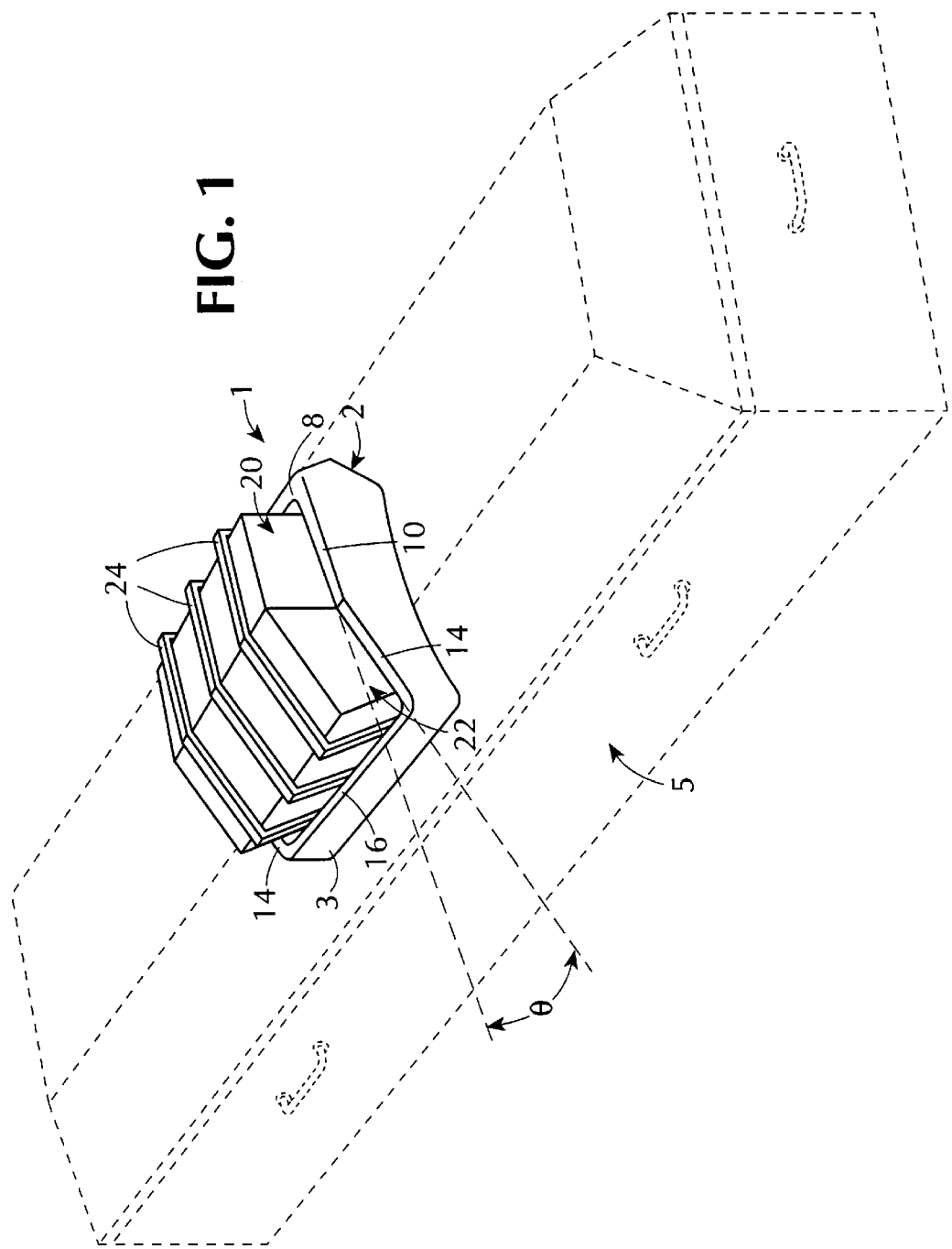
FIG. 1 is a perspective view of an assembled flower holder which is supported on the top surface of a casket and is constructed for holding a first foam block having a top surface which is parallel to the top surface of the casket and a second foam block which has a top surface which is angled relative to the top surface of the first block in accordance with the invention.

The invention is illustrated in connection with a double flower holder 1, shown in FIGS. 1–4, in which stems of flowers can be inserted such that the flowers extend orthogonally to the surfaces of water retaining blocks, the two surfaces intersecting at an angle. For purposes of illustration, the holder 1 is shown in FIG. 1 supported partly on the central, horizontally level top surface of a casket 5, and partly on a surface of the casket 5 at a side of the central surface. The casket 5 is indicated by dashes and is not a part of the present invention.

Referring to FIGS. 1–4, the holder 1 comprises a thermoplastic which can be vacuum formed or formed by blow molding, water impervious base member 2 having opposing bottom edges 3 which support the holder 1 on the side surface and the top surface of the casket 5. The base member 2 includes a cavity formed by a horizontal compartment 4 and a contiguous angled compartment 6 which extends from and at an acute angle θ relative to the horizontal compartment 4. It has been found that an angle θ between 20° and 30°, preferably about 25°, permits the use of the holder for most applications. The horizontal compartment 4 is defined by an upper lengthwise wall 8, a pair of vertical upper side walls 10 and a thin upper bottom wall 12. The angled compartment 6 is defined by a pair of side walls 14, a lengthwise wall 16 and a thin lower bottom wall 18. The side walls 14 and the bottom wall 18 are coextensive with and extend at the angle θ with respect to the side walls 10 and the bottom wall 12, respectively. The inner surface of the lengthwise walls 8, 16 and the inner surfaces of the side walls 10, 14 preferably slope outwardly with distance from the bottom walls 12, 18, respectively.

Figure 2:
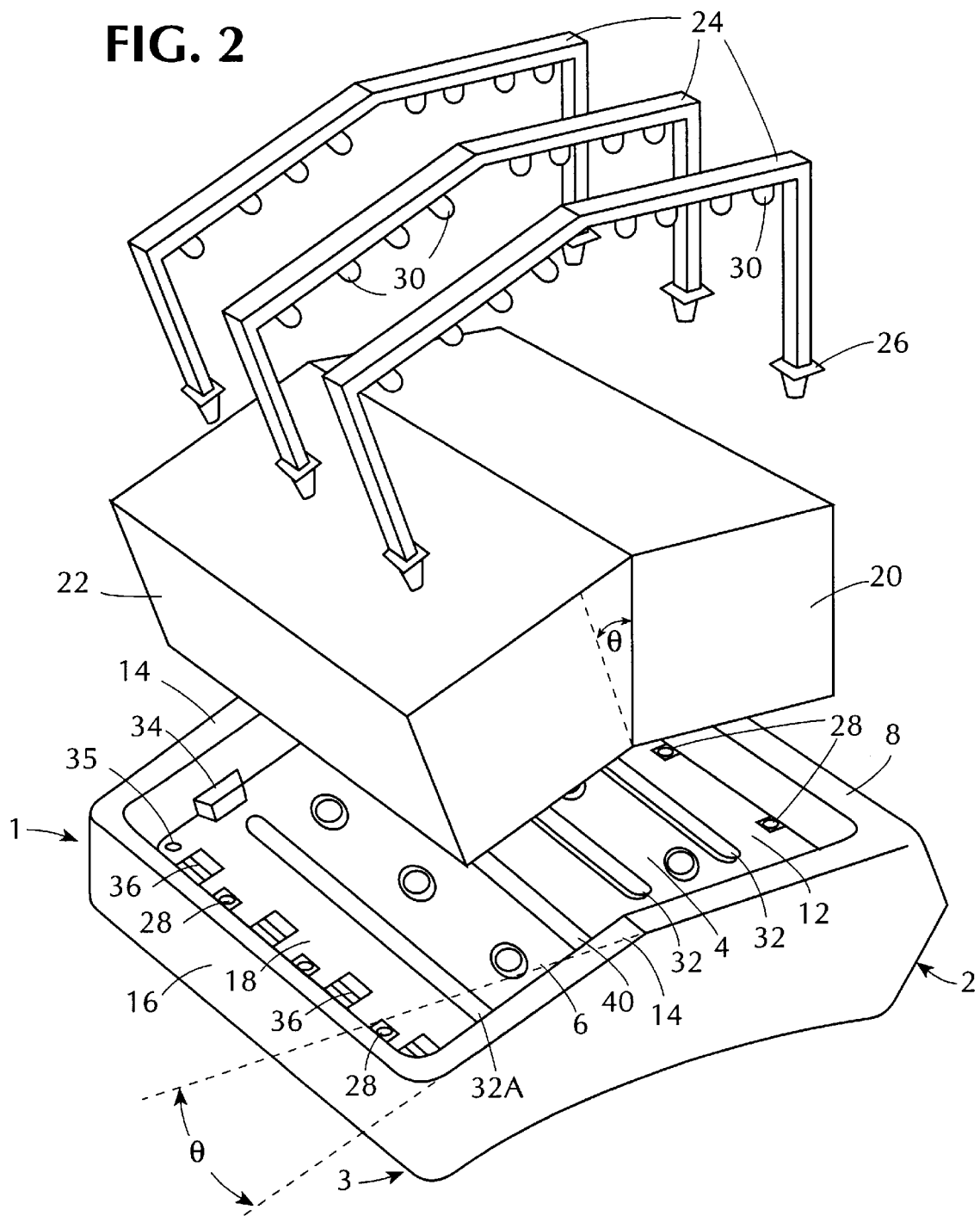
FIG. 2 is a fragmentary, exploded view of the components in the holder of FIG. 1.
Figure 4:
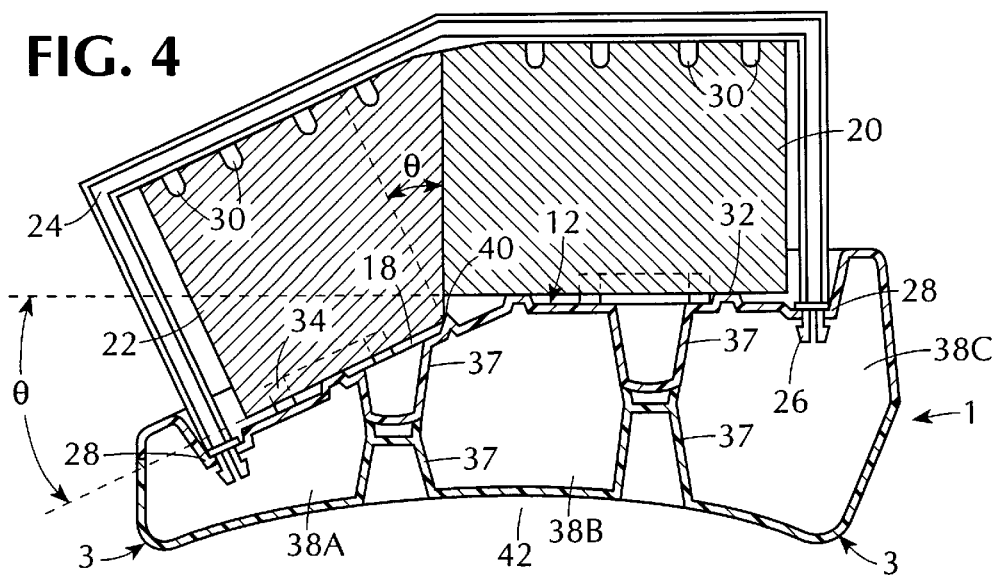
FIG. 4 is a transverse sectional view taken along the line 4—4 of FIG. 3.

Water absorbing and retaining plastic foam blocks 20, 22 of a well-known type are received in the compartments 4, 6, respectively, in side-by-side arrangement adjacent to each other, as shown in FIGS. 1, 2 and 4. The blocks 20, 22 are proportioned to substantially fit in the compartments 4, 6. In one preferred embodiment, illustrated in the figures, the foam block 20 has rectangular major surfaces and has a length substantially equal to the distance between the side walls 10 and a width slightly exceeding the distance between the wall 8 and the edge of the upper surface of the bottom wall 12 which is opposite the wall 8. The foam block 22 is identical in construction to the block 20, except that the face of the block 22 which is to be placed adjacent to and preferably abutting a face of the block 20 in the holder 1 is cut to taper toward the center of the block 22 at the same angle θ that the surface of the bottom wall 18 is inclined relative to the upper surface of the bottom wall 12. Thus, the side surface of the block 22 which abuts the side surface of the block 20 intersects the top surface of the block 22 at an angle less than 90°. The height of the blocks 20, 22 is normally greater than the height of the walls 8, 10, 14, 16 such that each block extends above the walls, as shown in FIGS. 1 and 4.

Figure 3:
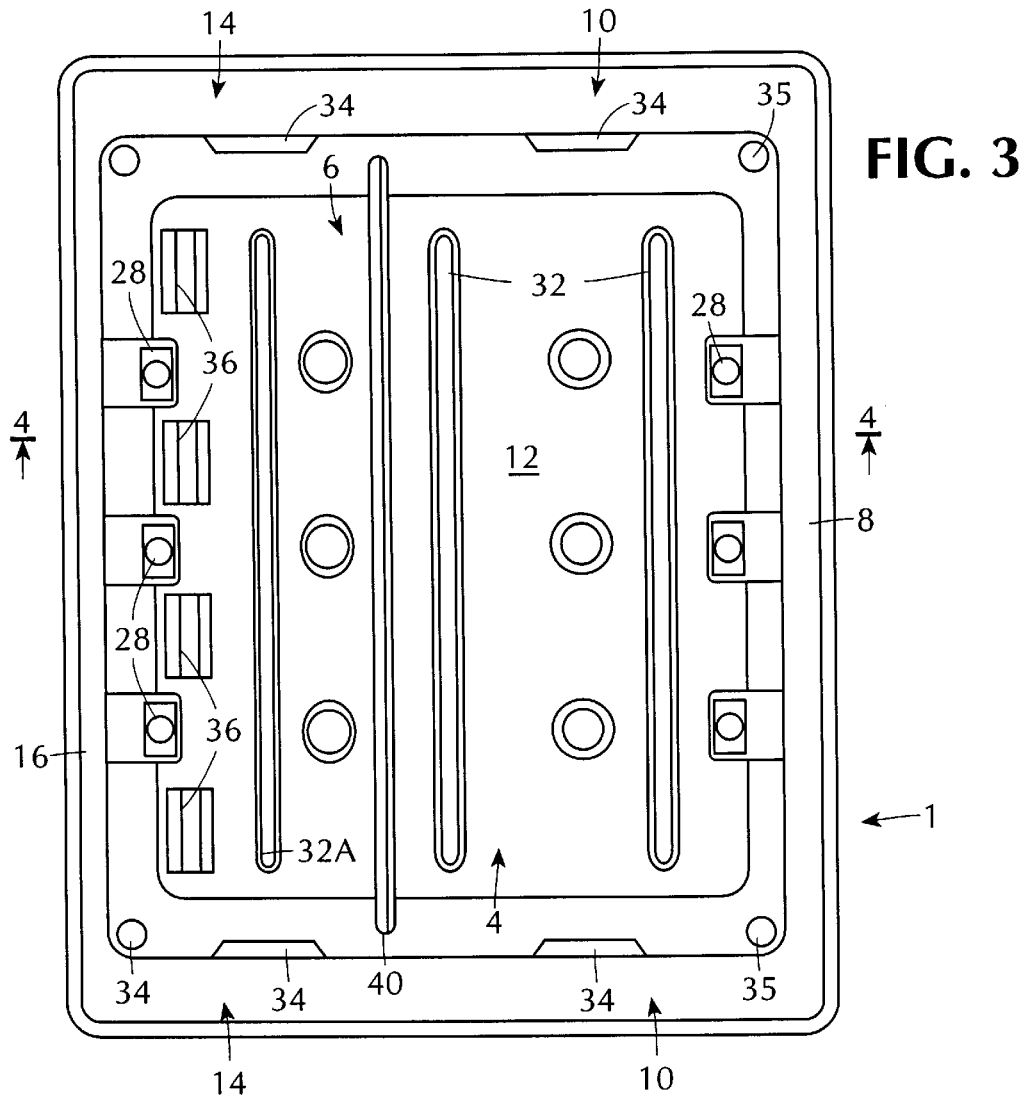
FIG. 3 is a plan view of the base member of the holder of FIG. 1.

Preferably, at least two support ledges 36, four being shown in FIGS. 2 and 3, protrude from the bottom wall 18 adjacent to the lower wall 16. The ledges 36 support the foam block 22 at the lower lengthwise edge of the face of the block 22 which faces the lower wall 16 and prevent the block 22 from engaging the wall 16.

A cutting, or knife edge, guide 40 is optionally included on the lower bottom wall 18 adjacent to the lengthwise edge of the upper surface of the upper bottom wall 12 from which the upper surface of the bottom wall 18 extends. The knife edge 40 extends between the side walls 14 and protrudes into the compartment 6. When the foam block 22 is placed in the compartment 6 and supported on the ledges 36, the knife edge 40 engages the lengthwise edge of the opposing side face of the block 22. The block 22 is, therefore, supported and held in place by the opposing elements of the ledges 36 and the knife edge 40.

The guide 40 can also be used during installation of the block 22. Normally, the water receiving blocks are rectangular, e.g., square in cross-section, and even though the blocks 20 and 22 are resilient and can be compressed, significant compression thereof is not desirable since compression of the blocks reduces their water holding capacity. Therefore, it is desirable to cutaway a portion of the block 22 so that its face which abuts the block 20 is substantially parallel to the abutting face of the block 20. Therefore, prior to the insertion of the block 20 in the compartment 4, the uncut block 22 can be placed in the compartment 6 and the guide 40 used to indicate the amount of the block 22 to be cut away. This can be done by "eye" or by marking the end of the block 22 with a line extending from the upper edge of the block 22 nearest the block 20 to the guide 40. Alternatively, with the conventional material used for the block 22, when the block 22 is pressed against a relatively sharp edge, e.g., a knife edge, a temporary depression is formed in the surface of the block 22 corresponding to the knife edge. Thus, before the block 20 is inserted in the compartment 4, the block 22 can be placed in contact with the ledges 36 and pressed against the knife edge guide 40. When the block 22 is thereafter removed, there is a visible depression at the lower surface of the block 22, corresponding to the knife edge guide 40 which can be used as a guide for cutting the block 22.

Of course, it is possible for the block 22 to be manufactured with the desired cross-sectional shape, and in such case, the knife edge 40 can be omitted. The foam blocks 20, 22 are retained in the compartments 4, 6, respectively, by being friction or push-fit into the holder 1 between the top wall 8 and the ledges 36. A push-fit of the blocks between the ledges 36 and the top wall 8 can be obtained because the tapered face of the block 22 abuts the opposing side face of the block 20 when the blocks 20, 22 are placed in the respective compartments 4, 6.

The blocks 20, 22 are also retained in the compartments by at least two U-shaped or stirrup fasteners 24, and preferably three fasteners. The fasteners 24 are shaped to engage the upper surfaces of the foam blocks 20, 22 and are detachably engageable with the base member 2 at the surfaces of the bottom walls 12, 18, near the top and bottom walls 8, 16, for retaining the blocks 20, 22. As best shown in FIG. 4, the extremities, or distal ends, of the fasteners 24 have resilient split ends and enlargements 26 which, after assembly of the blocks 20 and 22 with the holder 1, are pushed into the clip apertures 28 in the bottom walls 12 and 18 where they are detachably held. The fasteners 24 each includes projections or teeth 30 on the surface which faces the upper surfaces of the foam blocks 20, 22. When the fasteners 24 are engaged with the holder 1, the teeth 30 impinge upon the upper surfaces of the blocks 20, 22 to further secure the blocks 20, 22 in the holder 1.

Two stiffening ribs 32 are formed in the bottom wall 12 and extend between, but are spaced from, the side walls 10. A further rib 32A is formed in the bottom wall 18 and extends between, but is spaced from, the side walls 14.

Bumpers or stops 34 protrude from the side walls 10, 14 into the compartments 4, 6 to space the ends of the foam blocks 20, 22 from the walls 10, 14. The ribs 32 and the stops 34 also facilitate drainage of water through drainage apertures 35 which are provided in the bottom walls 12, 18 at corners of the compartments 4, 6. The drainage apertures 35 route water into a water receptacle comprising water-confining, interconnected chambers 38A, 38B and 38C which are formed between the bottom walls 12, 18 and lower bottom wall 42 of the base member 2, as shown in detail in FIG. 4.

Since the thickness of the bottom walls 12, 18 is relatively small, several hollow, circular stiffening pillars 37 are provided between the bottom walls 12, 18 and the holder bottom wall 42 and are spaced lengthwise between the respective side walls 10, 14 for advantageously stiffening the bottom walls 12 and 18. The pillars 37 prevent possible collapse of the bottom walls 12, 18 into the receptacles 38A, 38B, 38C when the blocks 20, 22 are fully soaked with water and flowers have been placed therein.

As previously mentioned, the holder 1 preferably is made of a vacuum formable or blow molding formable thermoplastic, and it will be observed that it is designed so that it can be formed as a unit. However, other forming techniques, such as injection molding, can be used, and parts of the holder can be made separately and secured together.

The holder 1 of the present invention with the blocks 20 and 22 therein can be used, for purposes of illustration, by placement of the holder 1 on the upper and side surface of the casket 5, as shown in FIG. 1. The holder 1 can be assembled with the foam blocks 20, 22 which can be saturated with water before or after they are placed in the compartments 4, 6, respectively. The stirrups 24 are placed over the foam blocks 20, 22 with their extremities 26 engaging the apertures 28 in the bottom walls 12, 18 and with the teeth 30 engaging the blocks 20, 22.

Flower stems can be inserted orthogonally to the top surface of the foam block 20 to extend vertically therefrom. Also, flower stems can be inserted orthogonally to the top surface of the foam block 22 to provide that these flowers extend away from the vertically extending stems in the block 20 at approximately the angle θ relative thereto, thereby covering the sloping portion of a support and permitting the flowers to drape over a side wall of the support. The orthogonal insertion of the stems into the block 22 allows for easy, quick, secure and aesthetic placement of flowers in the block 22. A floral arrangement having flowers which vertically extend from a holder and flowers which extend at an angle relative to the vertically extending flowers achieves pleasing aesthetic effects, such as, for example, the draping of flowers over the side of a casket when the holder is placed on the top surface of the casket.

As is conventional, any excess water which may drain from the blocks 20, 22 flows between the ledges 36 and between the blocks 20, 22 and the stops 34, through the apertures 35 and into the underlying receptacle comprising the chambers 38A, 38B and 38C, where the water is retained. Advantageously, the pillars 37 support the water and flower weight of the blocks 20, 22 to prevent the thin bottom walls 12, 18 from significant bending or collapsing into the chambers 38.

Although preferred embodiments of the present invention have been described and illustrated, it will be apparent to those skilled in the art that various modifications may be made without departing from the principles of the invention.

I claim:

1. A holder for articles requiring moisture comprising:
    a base member defining a cavity with adjacent first and second open and contiguous compartments, wherein the first compartment is defined by a plurality of walls comprising a first pair of side walls, a first lengthwise wall and a first bottom wall with an upper surface for supporting a first water absorbing block, wherein the second compartment is defined by a plurality of walls comprising a second pair of side walls, a second lengthwise wall and a second bottom wall with an upper surface for receiving a second water absorbing block, wherein the upper surface of the second bottom wall is inclined and extends at an acute angle with respect to the upper surface of said first bottom wall; and
    a water receptacle underlying at least one of the bottom walls and connected to the cavity by said one of the bottom walls having at least one drainage aperture therethrough for permitting water to flow from the cavity to the receptacle.

2. The holder of claim 1 comprising at least one stop protruding from each of the first and second side walls for spacing the first and second blocks from the first and second side walls.

3. The holder of claim 1, wherein the first bottom wall comprises at least one ridge extending upwardly from its upper surface protruding into the first compartment, said ridge extending at least part-way between the pair of the first side walls.

4. The holder of claim 1, further comprising a plurality of ledges adjacent said second lengthwise wall for engaging the second water receiving block and maintaining the second water absorbing block in spaced relation to the second lengthwise wall.

5. The holder of claim 1, wherein the base member has a base bottom wall spaced from said one of said bottom walls and has spaced base side walls which extend from the base bottom wall to said one bottom wall to form said water receptacle.

6. The holder of claim 5 wherein strengthening pillars extend between said base bottom wall and said one bottom wall for resisting bending of said one of said bottom walls.

7. The holder of claim 8, wherein a stirrup fastener includes at least one projecting means extending therefrom for engaging top surfaces of the first and second blocks for securing the first and second blocks in the first and second compartments.

8. The holder of claim 7, wherein the projecting means comprises a plurality of teeth.

9. The holder of claim 1 comprising at least one stirrup fastener having distal ends and the fastener being shaped to receive the water absorbing blocks, each fastener being detachably engageable with the base member.

10. The holder of claim 9, wherein the base member includes at least one pair of fastener retaining apertures in the first and second bottom walls for receiving the distal ends of the fastener, said distal ends being resiliently engageable with the wall of the respective aperture.

11. The holder of claim 1, wherein said first bottom wall and said second bottom wall intersect along a line and wherein there is a guide means on the second bottom wall adjacent to said line and extending between the pair of second side walls for engaging a second block in the second compartment.

12. The holder of claim 11, wherein the guide means is a knife edge.

13. The holder of claim 1 wherein said acute angle is from 20° to 30°.

14. A flower holder assembly comprising:
    a base member with first and second compartments defined by side walls joined to first and second bottom walls having upper surfaces which lie substantially in two different planes which intersect at an angle;
    a first water absorbing and flower stem penetrable block having a top surface, a bottom surface substantially parallel to said top surface of said block and a pair of side surfaces and mounted in said first compartment with its bottom surface in engagement with the upper surface of the first bottom wall;
    a second water absorbing and flower stem penetrable block having a top surface, a bottom surface substantially parallel to the top surface of the second block and a pair of side surfaces and mounted in said second compartment with the bottom surface of the second block in engagement with the upper surface of the second bottom wall and with one of the side surfaces of the second block adjacent and substantially parallel to a side surface of the first block;

fastening means securing the first block and the second block in their respective compartments; and a water receptacle underlying said bottom walls, said bottom walls having at least one aperture therethrough for the passage of water from the compartments into the receptacle.

15. The assembly of claim 13, wherein at least one of the side surfaces of one of the blocks which are adjacent to the side surface of the other block intersects the top surface of said one block at an angle less than 90°.

16. The assembly of claim 15 wherein said one side surface of said one of the blocks abuts the side surface of the other block.

17. The assembly of claim 14, wherein there are projections within the side walls for engaging and maintaining the blocks spaced from the side walls.

18. The assembly of claim 14, wherein the bottom walls have strengthening ribs extending at least partly between the side walls.

19. The assembly of claim 14, wherein there is a guide on the bottom wall of the second compartment adjacent the side surface of the second block which is adjacent the side wall of the first block.

20. The assembly of claim 14, wherein the base member has a base bottom wall spaced from said one of said bottom walls and has spaced base side walls which extend from the base bottom wall to said one bottom wall to form said water receptacle.

21. The assembly of claim 20, wherein strengthening pillars extend between said base bottom wall and said one bottom wall for resisting bending of said one bottom wall.

22. The assembly of claim 14, wherein said fastening means comprises a pair of stirrup fasteners which have resilient distal ends which are detachably engageable with the base member and the blocks.

23. The assembly of claim 13 wherein said angle is from 20° to 30°.

* * * * *

UNITED STATES PATENT AND TRADEMARK OFFICE
CERTIFICATE OF CORRECTION

PATENT NO.    : 5,943,820　　　　　　　　　　　　　　　　　　　　　　　Page 1 of 1
DATED         : August 31, 1999
INVENTOR(S)   : O'Connell It is certified that error appears in the above-identified patent and that said Letters Patent is hereby corrected as shown below:

<u>Column 6,</u>
Line 22, replace "8" by -- 10 --;
Line 27, replace "7" by -- 9 --;

<u>Column 7,</u>
Line 7, replace "13" by -- 14 --.

Signed and Sealed this

Third Day of June, 2003

JAMES E. ROGAN
*Director of the United States Patent and Trademark Office*